United States Patent
Furuta et al.

(10) Patent No.: US 10,639,735 B2
(45) Date of Patent: May 5, 2020

(54) WIRE ELECTRICAL DISCHARGE MACHINE

(71) Applicant: FANUC CORPORATION, Yamanashi (JP)

(72) Inventors: Tomoyuki Furuta, Yamanashi-ken (JP); Yasuo Nakashima, Yamanashi-ken (JP); Akiyoshi Kawahara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/879,531

(22) Filed: Jan. 25, 2018

(65) Prior Publication Data

US 2018/0214962 A1 Aug. 2, 2018

(30) Foreign Application Priority Data

Jan. 31, 2017 (JP) ................. 2017-015160

(51) Int. Cl.
*B23H 7/10* (2006.01)
*B23H 7/04* (2006.01)
*B23H 11/00* (2006.01)
*B23H 1/02* (2006.01)

(52) U.S. Cl.
CPC .............. *B23H 7/10* (2013.01); *B23H 1/028* (2013.01); *B23H 7/04* (2013.01); *B23H 11/00* (2013.01); *B23H 1/02* (2013.01)

(58) Field of Classification Search
CPC . B23H 7/10; B23H 7/04; B23H 1/028; B23H 7/30; B23H 7/20; B23H 1/04; B23H 1/024; B23H 7/065

USPC ................. 219/69.12, 69.13, 69.18
See application file for complete search history.

(56) References Cited

U.S. PATENT DOCUMENTS

| | | | | |
|---|---|---|---|---|
| 4,350,864 A | * | 9/1982 | Janicke | B23H 7/10 219/69.12 |
| 4,367,392 A | * | 1/1983 | Girardin | B23H 7/102 219/69.12 |
| 4,536,632 A | * | 8/1985 | Inoue | B23H 7/101 219/69.12 |
| 4,539,459 A | * | 9/1985 | Yamagata | B23H 7/101 219/69.12 |

(Continued)

FOREIGN PATENT DOCUMENTS

| | | |
|---|---|---|
| CN | 1064829 A | 9/1992 |
| JP | 5651091 B2 | 1/2015 |

(Continued)

OTHER PUBLICATIONS

English Abstract and Machine Translation for Japanese Publication No. 2016-016463 A, published Feb. 1, 2016, 8 pgs.

(Continued)

*Primary Examiner* — Jimmy Chou
(74) *Attorney, Agent, or Firm* — Fredrikson & Byron, P.A.

(57) ABSTRACT

A wire electrical discharge machine includes: an electrode unit for supplying a machining current to an electrode gap; a switch for changing impedance between a machining power source and the electrode unit; and a controller for, at the time of a core retaining process, controlling the switch to set the impedance to be higher than the impedance in a cutting process and thereby suppressing the machining current flowing through the electrode gap.

15 Claims, 6 Drawing Sheets

(56) References Cited

U.S. PATENT DOCUMENTS

| | | | | |
|---|---|---|---|---|
| 4,598,190 A * | 7/1986 | Balleys | B23H 7/04 | 219/69.12 |
| 4,652,716 A * | 3/1987 | Schneider | B23H 7/102 | 219/69.12 |
| 4,808,787 A * | 2/1989 | Futamura | B23H 7/02 | 219/69.12 |
| 4,818,848 A * | 4/1989 | Obara | B23H 7/102 | 219/69.12 |
| 4,843,203 A * | 6/1989 | Gamo | B23H 7/065 | 219/69.12 |
| 4,894,504 A * | 1/1990 | Truty | B23H 7/04 | 219/69.12 |
| 4,973,812 A * | 11/1990 | Aramaki | B23H 7/06 | 219/69.12 |
| 4,978,828 A * | 12/1990 | Umetsu | B23H 7/10 | 219/69.12 |
| 4,990,738 A * | 2/1991 | Taneda | B23H 7/10 | 219/69.12 |
| 4,999,473 A * | 3/1991 | Gamo | B23H 7/102 | 219/69.12 |
| 5,001,321 A * | 3/1991 | Iwasaki | B23H 7/102 | 219/69.12 |
| 5,006,692 A * | 4/1991 | Magara | B23H 7/102 | 219/69.12 |
| 5,006,693 A * | 4/1991 | Obara | B23H 7/04 | 219/69.12 |
| 5,012,063 A * | 4/1991 | Kawanabe | B23H 7/06 | 219/69.12 |
| 5,015,814 A * | 5/1991 | Morishita | B23H 7/02 | 219/69.12 |
| 5,019,684 A * | 5/1991 | Ito | B23H 7/04 | 219/69.12 |
| 5,036,174 A * | 7/1991 | Iwasaki | B23H 7/10 | 219/69.12 |
| 5,077,457 A * | 12/1991 | Onaka | B23H 7/10 | 219/69.12 |
| 5,086,203 A * | 2/1992 | Kobayashi | B23H 7/06 | 219/69.11 |
| 5,113,051 A * | 5/1992 | Sakaue | B23H 7/101 | 219/69.12 |
| 5,126,524 A * | 6/1992 | Moro | B23H 7/105 | 219/69.12 |
| 5,130,508 A * | 7/1992 | Umetsu | B23H 7/10 | 140/139 |
| 5,142,116 A * | 8/1992 | Yokomichi | B23H 7/10 | 219/69.12 |
| 5,149,931 A * | 9/1992 | Magara | B23H 1/022 | 219/69.13 |
| 5,233,147 A * | 8/1993 | Magara | B82Y 15/00 | 219/69.12 |
| 5,242,555 A * | 9/1993 | Buhler | B23H 7/06 | 204/297.06 |
| 5,276,301 A * | 1/1994 | Kohsaka | B23H 7/04 | 219/69.12 |
| 5,288,966 A * | 2/1994 | Kawanabe | B23H 7/10 | 219/69.12 |
| 5,302,796 A * | 4/1994 | Kuriki | B23H 7/10 | 219/69.12 |
| 5,362,936 A * | 11/1994 | Ishibashi | B23H 7/04 | 219/69.12 |
| 5,451,737 A * | 9/1995 | Bertholds | B23H 7/02 | 219/69.12 |
| 5,573,681 A * | 11/1996 | Ishibashi | B23H 7/065 | 219/69.12 |
| 5,585,014 A * | 12/1996 | Magara | B23H 1/022 | 219/69.13 |
| 5,603,851 A * | 2/1997 | Noda | B23H 7/102 | 219/69.12 |
| 5,744,775 A * | 4/1998 | Yasuda | B23H 7/04 | 219/69.12 |
| 5,753,880 A * | 5/1998 | Kajitori | B23H 7/102 | 219/69.12 |
| 5,756,956 A * | 5/1998 | Sato | B23H 7/04 | 219/69.18 |
| 5,859,401 A * | 1/1999 | Kajitori | B23H 7/02 | 219/69.12 |
| 5,874,702 A * | 2/1999 | Hayakawa | B23H 1/10 | 219/69.12 |
| 6,028,282 A * | 2/2000 | Toyonaga | B23H 7/104 | 219/69.12 |
| 6,278,075 B1 * | 8/2001 | Kamiguchi | B23H 7/04 | 219/69.12 |
| 6,320,151 B1 * | 11/2001 | Angelella | B23H 7/04 | 219/69.12 |
| 6,344,624 B1 * | 2/2002 | Moro | B23H 7/02 | 219/69.12 |
| 6,403,911 B1 * | 6/2002 | Shih | B23H 7/102 | 219/69.12 |
| 6,552,291 B1 * | 4/2003 | Kobayashi | B23H 7/101 | 219/69.12 |
| 6,744,002 B1 * | 6/2004 | Goto | B23H 7/02 | 219/69.12 |
| 6,781,080 B1 * | 8/2004 | Sato | B23H 7/04 | 219/69.12 |
| 6,806,434 B1 * | 10/2004 | Suzuki | B23H 1/022 | 219/69.13 |
| 6,815,630 B1 * | 11/2004 | Ishihara | B23H 7/108 | 219/69.12 |
| 6,832,126 B2 * | 12/2004 | Irie | B23H 7/065 | 219/69.11 |
| 8,003,911 B2 * | 8/2011 | Onodera | B23H 7/04 | 219/69.12 |
| 8,525,063 B2 * | 9/2013 | Yamazaki | B23H 1/02 | 219/69.12 |
| 8,586,891 B2 * | 11/2013 | Hashimoto | B23H 7/107 | 219/69.12 |
| 8,746,174 B2 * | 6/2014 | Nakano | H01J 37/32559 | 118/723 E |
| 8,759,708 B2 * | 6/2014 | Inaba | B23H 7/102 | 219/69.12 |
| 8,975,554 B2 * | 3/2015 | Kawahara | B23H 1/022 | 219/69.12 |
| 9,085,038 B2 * | 7/2015 | Inaba | B23H 1/10 | |
| 9,130,554 B2 * | 9/2015 | Hashimoto | H03K 3/354 | |
| 9,199,326 B2 * | 12/2015 | Yamaoka | B23H 1/04 | |
| 9,440,300 B2 * | 9/2016 | Takada | B23H 1/022 | |
| 9,844,825 B2 * | 12/2017 | Boccadoro | B23H 1/024 | |
| 2001/0007319 A1 * | 7/2001 | Moro | B23H 7/101 | 219/69.12 |
| 2001/0014411 A1 * | 8/2001 | Seong | B21C 37/042 | 428/613 |
| 2001/0025831 A1 * | 10/2001 | Kobayashi | B23H 7/02 | 219/69.12 |
| 2002/0128743 A1 * | 9/2002 | Kurihara | B23H 7/04 | 700/162 |
| 2003/0010753 A1 * | 1/2003 | Yamada | B23H 7/102 | 219/69.12 |
| 2004/0193306 A1 * | 9/2004 | Kurihara | B23H 7/04 | 700/162 |
| 2005/0115929 A1 * | 6/2005 | Sakurai | B23H 1/022 | 219/69.13 |
| 2005/0145603 A1 * | 7/2005 | Goto | B23H 7/04 | 219/69.12 |
| 2005/0269296 A1 * | 12/2005 | Arakawa | B23H 7/04 | 219/69.12 |
| 2006/0065637 A1 * | 3/2006 | Kita | B23H 7/107 | 219/69.12 |
| 2006/0091113 A1 * | 5/2006 | Hiraga | B23H 7/04 | 219/69.12 |
| 2007/0023400 A1 * | 2/2007 | Buhler | B23H 1/022 | 219/69.18 |
| 2007/0039929 A1 * | 2/2007 | Buhler | B23H 1/022 | 219/69.18 |
| 2007/0156278 A1 * | 7/2007 | Hiraga | G05B 19/406 | 700/184 |
| 2007/0228016 A1 * | 10/2007 | Kita | B23H 7/104 | 219/69.12 |

(56) References Cited

U.S. PATENT DOCUMENTS

| | | | | |
|---|---|---|---|---|
| 2008/0053963 A1* | 3/2008 | Kita | B23H 7/104 | 219/69.12 |
| 2008/0110865 A1* | 5/2008 | Hashimoto | B23H 1/022 | 219/69.12 |
| 2008/0142487 A1* | 6/2008 | Sakaguchi | B23H 7/102 | 219/69.12 |
| 2008/0217300 A1* | 9/2008 | Kita | B23H 7/104 | 219/69.12 |
| 2008/0277383 A1* | 11/2008 | Sandlin | B23H 1/10 | 219/69.12 |
| 2009/0101627 A1* | 4/2009 | Kawahara | B23H 7/04 | 219/69.12 |
| 2009/0194511 A1* | 8/2009 | Luo | B23H 7/02 | 219/69.12 |
| 2009/0314747 A1* | 12/2009 | Hashimoto | B23H 1/022 | 219/69.13 |
| 2010/0084378 A1* | 4/2010 | Onodera | B23H 7/04 | 219/69.13 |
| 2010/0133237 A1* | 6/2010 | Onodera | B23H 1/022 | 219/69.13 |
| 2010/0187203 A1* | 7/2010 | Bamberg | B23H 1/028 | 219/69.12 |
| 2010/0199909 A1* | 8/2010 | Bamberg | B22F 8/00 | 117/13 |
| 2012/0031879 A1* | 2/2012 | Abe | B23H 7/065 | 219/69.12 |
| 2012/0048833 A1* | 3/2012 | Kawahara | B23H 1/022 | 219/69.13 |
| 2012/0138576 A1* | 6/2012 | Chuang | B23H 7/02 | 219/69.12 |
| 2012/0193326 A1* | 8/2012 | Mitsuyasu | B23H 7/04 | 219/69.17 |
| 2012/0223055 A1* | 9/2012 | Kawahara | B23H 7/065 | 219/69.12 |
| 2012/0292292 A1* | 11/2012 | Lin | B23H 5/02 | 219/69.12 |
| 2012/0305530 A1* | 12/2012 | Inaba | B23H 7/102 | 219/69.12 |
| 2013/0186865 A1* | 7/2013 | Yamaoka | B23H 1/04 | 219/69.12 |
| 2013/0193112 A1* | 8/2013 | Murai | B23H 1/024 | 219/69.12 |
| 2013/0193113 A1* | 8/2013 | Nakajima | B23H 1/00 | 219/69.12 |
| 2013/0206731 A1* | 8/2013 | Takahashi | B23H 7/20 | 219/69.12 |
| 2013/0220979 A1* | 8/2013 | Yamaoka | B23H 1/02 | 219/69.12 |
| 2013/0240486 A1* | 9/2013 | Yamada | B23H 7/104 | 219/69.12 |
| 2013/0248494 A1* | 9/2013 | Inaba | B23H 1/10 | 219/69.12 |
| 2013/0277335 A1 | 10/2013 | Matsunaga et al. | | |
| 2013/0341305 A1* | 12/2013 | Tsukamoto | B23H 7/36 | 219/69.12 |
| 2014/0014625 A1* | 1/2014 | Yamaoka | B23H 1/04 | 219/69.12 |
| 2014/0144885 A1* | 5/2014 | Onodera | B23H 7/104 | 219/69.12 |
| 2014/0197138 A1* | 7/2014 | Yoshizaki | B23H 7/065 | 219/69.12 |
| 2014/0203000 A1* | 7/2014 | Mitsuyasu | B23H 7/38 | 219/124.21 |
| 2014/0284311 A1* | 9/2014 | Yoshida | B23H 1/024 | 219/69.12 |
| 2014/0291295 A1* | 10/2014 | Kasai | B23H 7/065 | 219/69.12 |
| 2014/0305908 A1* | 10/2014 | Nakajima | B23H 7/108 | 219/69.12 |
| 2014/0319101 A1* | 10/2014 | Nakajima | B23H 7/102 | 219/69.12 |
| 2014/0374385 A1* | 12/2014 | Kawano | B23H 7/04 | 219/69.12 |
| 2015/0027992 A1* | 1/2015 | Furuta | B23H 7/18 | 219/69.16 |
| 2015/0053650 A1* | 2/2015 | Miyake | B23H 9/00 | 219/69.12 |
| 2015/0129558 A1* | 5/2015 | Otomo | B23H 7/36 | 219/69.12 |
| 2015/0144599 A1* | 5/2015 | Kouda | F16C 33/6681 | 219/69.12 |
| 2015/0202704 A1* | 7/2015 | Yoshida | B23H 7/101 | 219/69.12 |
| 2015/0217390 A1* | 8/2015 | Sasaki | B23H 1/022 | 219/69.13 |
| 2015/0217391 A1* | 8/2015 | Yanagisawa | B23H 1/022 | 219/69.18 |
| 2015/0231716 A1* | 8/2015 | Yamazaki | B23H 1/024 | 219/69.12 |
| 2015/0290733 A1* | 10/2015 | Nakagawa | B23H 7/104 | 219/69.12 |
| 2015/0367437 A1* | 12/2015 | Irie | B23H 1/024 | 219/69.11 |
| 2016/0001385 A1 | 1/2016 | Nakashima et al. | | |
| 2016/0023291 A1* | 1/2016 | Inoue | B23H 1/02 | 219/69.12 |
| 2016/0039025 A1* | 2/2016 | Nishikawa | B23H 1/024 | 219/69.12 |
| 2016/0039029 A1* | 2/2016 | Hasegawa | B23H 7/16 | 219/69.12 |
| 2016/0045966 A1* | 2/2016 | Hasegawa | B23H 1/024 | 219/69.12 |
| 2016/0074950 A1* | 3/2016 | Sasaki | B23H 7/36 | 219/69.12 |
| 2016/0089715 A1* | 3/2016 | O'Keeffe | B22D 17/04 | 164/113 |
| 2016/0136745 A1* | 5/2016 | Hasegawa | B23H 7/20 | 219/69.12 |
| 2016/0184911 A1* | 6/2016 | Masuda | B23H 1/02 | 219/69.12 |
| 2016/0288230 A1* | 10/2016 | Furuta | B23H 1/02 | |
| 2018/0036815 A1* | 2/2018 | Masuda | B23H 1/02 | |

FOREIGN PATENT DOCUMENTS

| | | |
|---|---|---|
| JP | 5677629 B1 | 2/2015 |
| JP | 201616463 A | 2/2016 |
| JP | 2016168637 A | 9/2016 |
| WO | 2013187201 A1 | 12/2013 |

OTHER PUBLICATIONS

English Abstract and Machine Translation for Japanese Publication No. 5677629 B1, published Feb. 25, 2015, 22 pgs.

English Abstract and Machine Translation for International Publication No. WO2013187201 A1, published Dec. 19, 2013, 23 pgs.

Extended European Search Report dated Jun. 21, 2018 for corresponding EP Application No. 18154015.4, 7 pgs.

English Abstract for Japanese Publication No. 5651091 B2, published Jan. 7, 2015, 2 pgs.

English Machine Translation for Chinese Publication No. 1064829 A, published Sep. 30, 1992, 14 pgs.

English Abstract and Machine Translation for Japanese Publication No. 2016-168637 A, published Sep. 23, 2016, 11 pgs.

* cited by examiner

WIRE ELECTRICAL DISCHARGE MACHINE

CROSS-REFERENCE TO RELATED APPLICATION

This application is based upon and claims the benefit of priority from Japanese Patent Application No. 2017-015160 filed on Jan. 31, 2017, the contents of which are incorporated herein by reference.

BACKGROUND OF THE INVENTION

Field of the Invention

The present invention relates to a wire electrical discharge machine having a core retaining function for retaining cores during machining.

Description of the Related Art

Japanese Patent No. 5651091 discloses a method of cutting out a part from a workpiece with making partially welded spots in wire electrical discharge machining. To briefly explain this method, in the case of switching the machining operation from a cutting mode to a welding mode, the machining conditions are changed into conditions for welding. That is, high voltage load (voltage) for electrical discharge is lowered so as to suppress the machining current through the electrode gap and lengthen the time of voltage application. With this arrangement, part of the wire electrode is melted so that a core can be welded to the workpiece by the melted substance.

SUMMARY OF THE INVENTION

However, in the above-mentioned Japanese Patent No. 5651091, since the machining current flowing through the electrode gap is suppressed by lowering the voltage of the machining power supply, the peak value of the suppressible machining current is greatly affected by the performance of the machining power supply. For this reason, it is necessary to use and select a machining power supply which can output a sufficiently low voltage that is not needed for ordinary machining. That is, the machining power supply to be used needs to have a high performance configuration that can output a wide range of voltage, which ends up increase in cost.

It is therefore an object of the present invention to provide a wire electrical discharge machine that can sufficiently suppress the machining current flowing through the electrode gap during a core retaining process without use of any expensive machining power supply having a wide voltage output range as described above.

According to an aspect of the present invention, a wire electrical discharge machine using a machining power source to apply a machining current across an electrode gap formed between a wire electrode and a workpiece to be machined and thereby perform electrical discharge machining on the workpiece, includes: an electrode unit configured to supply the machining current to the electrode gap; a switch configured to change impedance between the machining power source and the electrode unit; and a controller configured to, at the time of a core retaining process, control the switch to set the impedance to be higher than the impedance in a cutting process and thereby suppress the machining current flowing through the electrode gap.

According to the present invention, it is possible to sufficiently suppress the machining current flowing through the electrode gap during a core retaining process without using an expensive machining power source that can output a wide range of voltage. Therefore, cores can be welded to the workpiece with an inexpensive configuration.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A wire electrical discharge machine according to the present invention will be detailed hereinbelow by describing preferred embodiments with reference to the accompanying drawings.

First Embodiment

Figure 1:
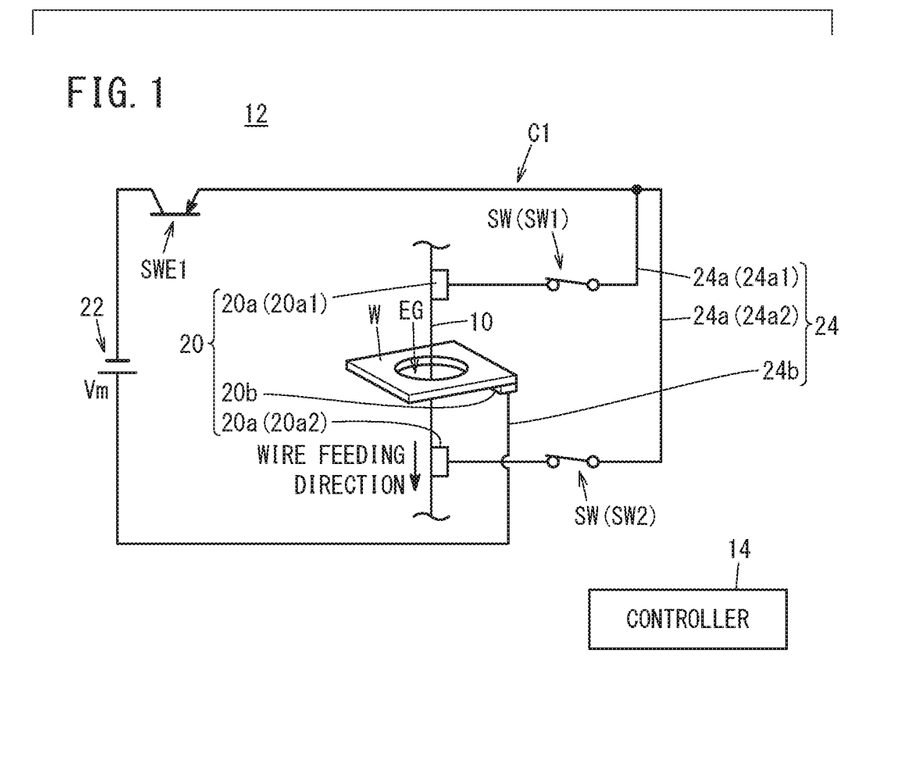
FIG. 1 is a diagram showing a configuration example of a wire electrical discharge machine according to a first embodiment of the present invention.

FIG. 1 is a diagram showing a configuration example of a wire electrical discharge machine 12 according to a first embodiment of the present invention. The wire electrical discharge machine 12 performs electrical discharge machining by applying voltage across an electrode gap EG formed between a wire electrode 10 and an object to be machined (workpiece) W to flow a machining current (discharge current). The wire electrical discharge machine 12 machines the workpiece W by feeding the wire electrode 10 in the Z-direction toward the workpiece W while changing the relative position between the wire electrode 10 and the workpiece W on the XY-plane orthogonal to the Z-direction. That is, the wire electrode 10 is relatively moved along a predetermined path on the workpiece W to thereby machine the workpiece W. A core is formed during this cutting process. The wire electrical discharge machine 12 has a core retaining function for fixing the core that was formed during machining, to the workpiece W.

The wire electrical discharge machine 12 includes a circuit (hereinafter referred to as a machining circuit) C1 for applying a voltage (machining voltage) Vm across the electrode gap EG to flow a machining current, and a controller 14 for controlling components of the wire electrical discharge machine 12 inclusive of the machining circuit C1. The machining circuit C1 includes an electrode unit 20, a power source (hereinafter referred to as a machining power source) 22, a switching element SWE1, and switches SW.

The electrode unit 20 is adapted to supply machining current to the electrode gap EG and has first electrode parts 20a connected to the wire electrode 10 and a second electrode part 20b connected to the workpiece W. The first electrode parts 20a are made up of two electrode parts, one part being located on the upstream side of the workpiece W (on the upper side of the workpiece W in FIG. 1) while the other part being located on the downstream side of the workpiece W (on the lower side of the workpiece W in FIG. 1) with respect to the feeding direction of the wire electrode 10. In order to distinguish the first electrode parts 20a on the upstream side and the downstream side from each other, the first electrode part 20a located upstream of the workpiece W is referred to as 20a1 whereas the first electrode part 20a located downstream of the workpiece W is referred to as 20a2.

The machining power source 22 has a DC current power supply. In the first embodiment, in order to apply the positive polarity voltage Vm to the electrode gap EG, the negative terminal (− terminal) of the machining power source 22 is connected to the wire electrode 10 (first electrode parts 20a), and the positive terminal (+ terminal) is connected to the workpiece W (the second electrode part 20b). It should be noted that the machining power source 22 may be configured to selectively apply one of the positive polarity voltage Vm and the negative polarity voltage Vm to the electrode gap EG.

The electrode unit 20 and the machining power source 22 are connected by current supply lines 24. The current supply lines 24 include a first current supply line 24a that connects the machining power source 22 (negative terminal) with the first electrode parts 20a and a second current supply line 24b that connects the machining power source 22 (positive terminal) with the second electrode part 20b. Here, for convenience sake, the first current supply line 24a connected to the first electrode part 20a1 located upstream of the workpiece W is called 24a1 and the first current supply line 24a connected to the first electrode part 20a2 located downstream of the workpiece W is called 24a2.

The switching element SWE1 is provided to supply machining current from the machining power source 22 to the electrode gap EG. The switching element SWE1 is arranged between the machining power source 22 and the electrode gap EG and connected in series with the machining power source 22 and the electrode gap EG. In the first embodiment, the switching element SWE1 is arranged between the machining power source 22 and the first electrode part 20a (the wire electrode 10) and connected in series with the machining power source 22 and the first electrode part 20a (the wire electrode 10). That is, the switching element SWE1 is disposed on the first current supply line 24a. By turning on the switching element SWE1, the voltage Vm of the machining power source 22 is applied to the electrode gap EG so that a machining current flows through the electrode gap EG. That is, as the switching element SWE1 is turned on and off, application of the voltage Vm to the electrode gap EG is turned on and off accordingly. The switching element SWE1 may be a switching element such as an FET.

Note that the switching element SWE1 may be arranged between the machining power source 22 and the second electrode part 20b (the workpiece W) and connected in series with the machining power source 22 and the second electrode part 20b (the workpiece W). That is, the switching element SWE1 may be disposed on the second current supply line 24b. Alternatively, the two switching elements SWE1 may be arranged respectively between the machining power source 22 and the first electrode part 20a and between the machining power source 22 and the second electrode part 20b.

The switches SW serve to change the impedance between the electrode unit 20 (electrode parts 20a, 20b) and the machining power source 22. In order to change the impedance between the first electrode parts 20a and the machining power source 22, the switches SW are provided for the first current supply lines 24a (24a1, 24a2) connected between the first electrode parts 20a (20a1, 20a2) and the machining power source 22. The switches SW are disposed on the first current supply lines 24a (24a1, 24a2). Here, the switch SW provided for the first current supply line 24a1 is referred to as SW1, and the switch SW provided for the first current supply line 24a2 is referred to as SW2. The switch SW may be a switching element such as an FET.

Figure 2:
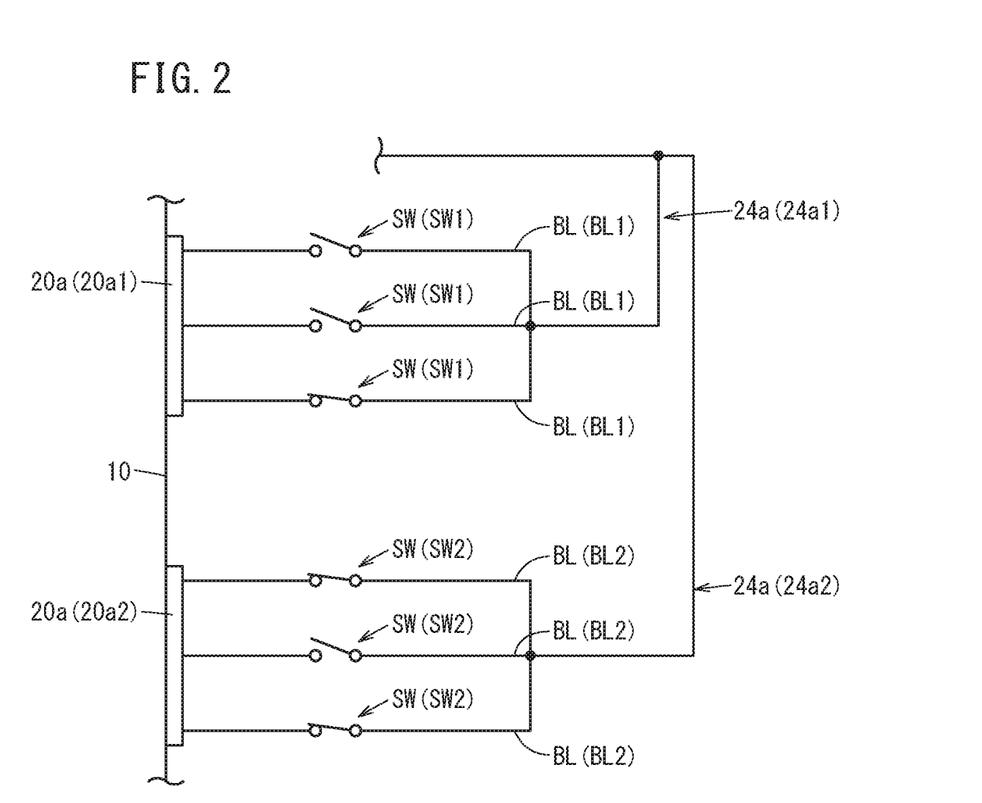
FIG. 2 is a diagram showing a specific configuration example of first current supply lines and switches shown in FIG. 1.

FIG. 2 is a diagram showing a specific configuration example of the first current supply lines 24a and the switches SW. Each of the first current supply lines 24a branches into a plurality of current lines BL, and the multiple branched current lines BL are each connected to the first electrode part 20a. At least one of current lines BL among the multiple branched current lines BL includes the switch SW. In the first embodiment, each of the first current supply lines 24a branches into three lines BL, and the switch SW is disposed on each of the lines BL.

Herein, the current lines BL branched from the first current supply line 24a1 and connected to the first electrode part 20a1 are denoted by BL1, and the current lines BL branched from the first current supply line 24a2 and connected to the first electrode part 20a2 are denoted by BL2. Thus, the switches SW1 are disposed on the current lines BL1, and the switches SW2 are disposed on the current lines BL2.

The controller 14 shown in FIG. 1 performs on-off control of the switching element SWE1 and the switches SW in accordance with machining conditions to thereby perform electrical discharge machining on the workpiece W. At the time of ordinary machining (cutting cycle), the controller 14 turns on (closes) all the switches SW and performs on-off control of the switching element SWE1 to machine the workpiece W. On the other hand, in the core retaining process (at the time of core retaining cycle), the controller 14 turns off (opens) at least one of the switches SW and performs on/off control of the switching element SWE1 so as to melt part of the wire electrode 10 while perform cutting to thereby weld and stick the core to the workpiece W with the melted material.

The controller 14 performs machining by moving the wire electrode 10 along a predetermined path on the workpiece W to be machined. In principle, the controller 14 machines the workpiece W in accordance with the machining conditions of the cutting cycle (cutting process). In the cutting cycle, all the switches SW are set in the ON (closed) state. When the wire electrode 10 passes through predetermined points for fixing (for example, four points) on the path, the controller 14 changes operation from the cutting cycle to the retaining cycle (core retaining process) to thereby machine the workpiece W in accordance with the machining conditions for retaining cycle (machining conditions for welding) while fusing part of the wire electrode 10 and fixing the core to the workpiece W with the melt. As a result, the core is fixed to the workpiece W at predetermined positions along the path. In the retaining cycle, at least one of the switches SW is in the off (open) state.

Since it is necessary to suppress the machining current flowing through the electrode gap EG at the time of retaining cycle, the controller 14 turns off at least one of the switches SW according to the machining conditions for the retaining cycle, so as to increase the impedance between the electrode unit 20 and the machining power source 22. That is, the impedance between the electrode unit 20 and the machining power source 22 in the retaining cycle is set higher than the impedance in the cutting cycle.

In the example shown in FIG. 2, two of the three switches SW1 are turned off and one of the three switches SW2 is turned off. The number and location of the switches SW (SW1, SW2) to be turned off are determined according to the machining conditions of the retaining cycle. In this way, it is possible to increase the impedance between the electrode unit 20 and the machining power source 22, more specifically, the impedance between the first electrode parts 20a and the machining power source 22, hence sufficiently suppress the machining current flowing through the electrode gap EG without lowering the set value of the machining voltage. Therefore, it is possible to firmly and sufficiently weld cores to the workpiece W with an inexpensive configuration. In addition to increasing the impedance by turning off the switches SW (SW1, SW2), if the set value of the machining voltage is lowered, it is possible to produce and apply a machining current with a lower peak. In this case, the core can be welded to the workpiece W more reliably. When no machining current flows through the electrode gap EG if all the switches SW are turned off as in the case of FIG. 2, it never happens that all the switches SW are turned off.

Second Embodiment

Figure 3:
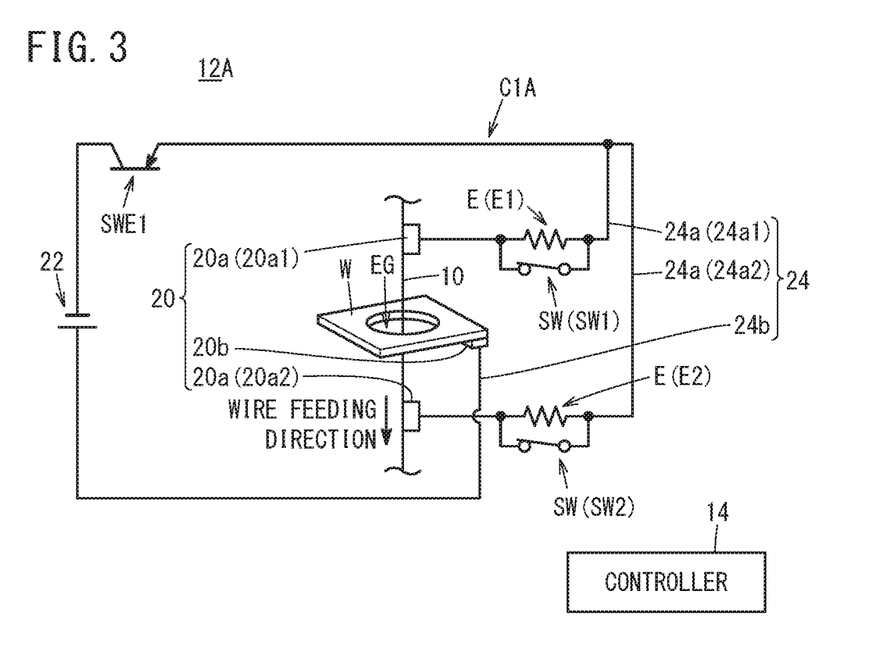
FIG. 3 is a diagram showing a configuration example of a wire electrical discharge machine according to a second embodiment of the present embodiment.

FIG. 3 is a diagram showing a configuration example of a wire electrical discharge machine 12A according to a second embodiment of the present invention. In the second embodiment, the same components as those described in the first embodiment are allotted with the same reference numerals and only different parts will be described below.

The machining circuit, designated by C1A, of the wire electrical discharge machine 12A of the second embodiment is the same as the machining circuit C1 described in the first embodiment except that a current suppression element E is disposed on each of the first current supply lines 24a and the switch SW is provided for the first current supply line 24a so as to be connected in parallel with the current suppression element E. The current suppression element E disposed on the first current supply line 24a1 is denoted as E1 and the current suppression element E disposed on the first current supply line 24a2 is denoted as E2. Therefore, the switch SW1 provided for the first current supply line 24a1 is connected in parallel with the current suppression element E1, whereas the switch SW2 provided for the first current supply line 24a2 is connected in parallel with the current suppression element E2. Though in FIG. 3 a resistor is illustrated as the current suppression element E, an inductor (coil) may be provided as the current suppression element E.

Figure 4:
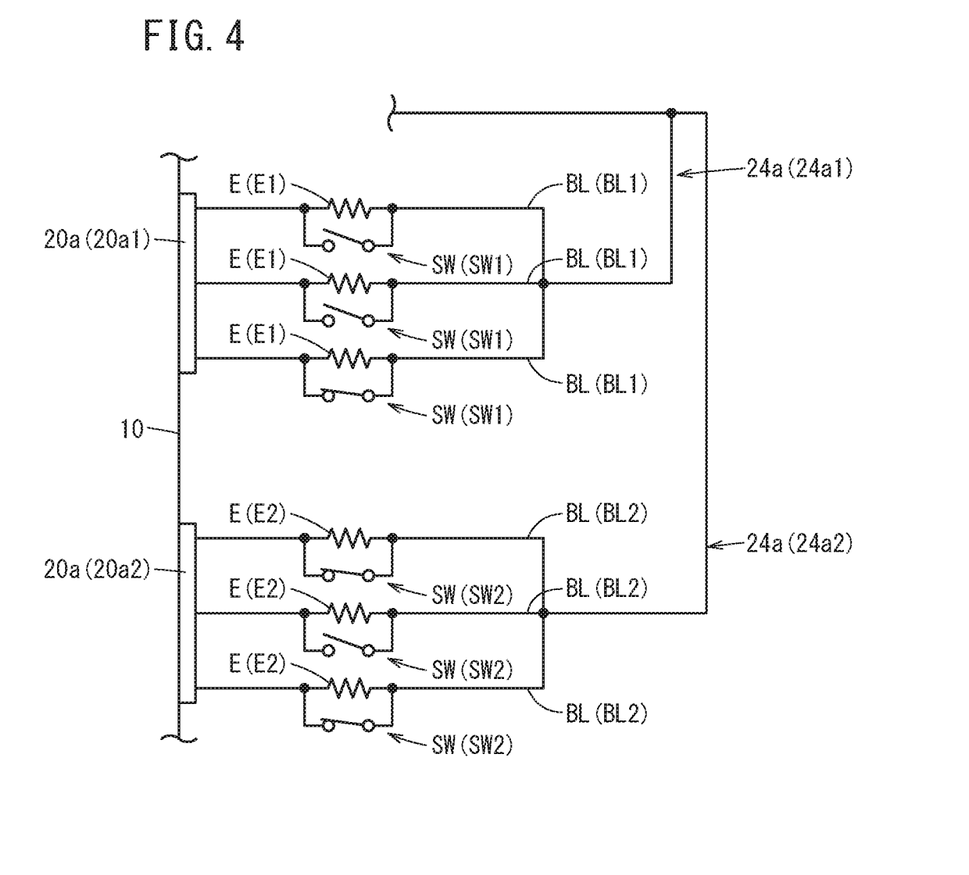
FIG. 4 is a diagram showing a specific configuration example of first current supply lines, current suppression elements and switches shown in FIG. 3.

FIG. 4 is a diagram showing a specific configuration example of first current supply lines 24a, current suppression elements E and switches SW in the second embodiment. The current suppression element E is disposed on at least one of the multiple current lines BL branched from the first current supply line 24a. The current suppression element E1 is disposed on the current line BL1 of the first current supply line 24a1 and the current suppression element E2 is disposed on the current line BL2 of the first current supply line 24a2. Therefore, the switch SW1 is provided for the current line BL1 so as to be connected in parallel with the current suppression element E1, and the switch SW2 is provided for the current line BL2 so as to be connected in parallel with the current suppression element E2. Also in the second embodiment, it is assumed that three branched current lines BL are provided, and the switch SW and the current suppression element E are provided in each of the three branched current lines BL.

Also in the second embodiment, the controller 14 performs on-off control of the switching element SWE1 and the switches SW in accordance with machining conditions to thereby perform electrical discharge machining on the workpiece W. At the time of ordinary machining (cutting cycle), the controller 14 turns on (closes) all the switches SW and performs on-off control of the switching element SWE1 to machine the workpiece W. On the other hand, at the time of the core retaining process (retaining cycle), the controller 14 turns off (opens) at least one of the switches SW and performs on/off control of the switching element SWE1 so as to melt part of the wire electrode 10 while machining the workpiece to thereby weld the core to the workpiece W with the molten material.

Since it is necessary to suppress the machining current flowing through the electrode gap EG in the core retaining mode, the controller 14 turns off at least one of the switches SW according to the machining conditions for the retaining cycle (machining conditions for welding), so as to increase the impedance between the electrode unit 20 and the machining power source 22. That is, the impedance between the electrode unit 20 and the machining power source 22 in the retaining cycle is set higher than the impedance in the cutting cycle.

In the example shown in FIG. 4, two of the three switches SW1 are turned off and one of the three switches SW2 is turned off. The number and location of the switches SW (SW1, SW2) to be turned off are determined according to the machining conditions of the retaining cycle. In this way, it is possible to increase the impedance between the electrode unit 20 and the machining power source 22, more specifically, the impedance between the first electrode parts 20a and the machining power source 22, hence sufficiently suppress the machining current flowing through the electrode gap EG without lowering the set value of the machining voltage. Therefore, it is possible to firmly and sufficiently weld cores to the workpiece W with an inexpensive configuration.

Modifications

Each of the above embodiments may be modified as follows. In the following modifications, the same components as those described in the above embodiments are allotted with the same reference numerals, and only different portions will be described below.

Modification 1

Figure 5:
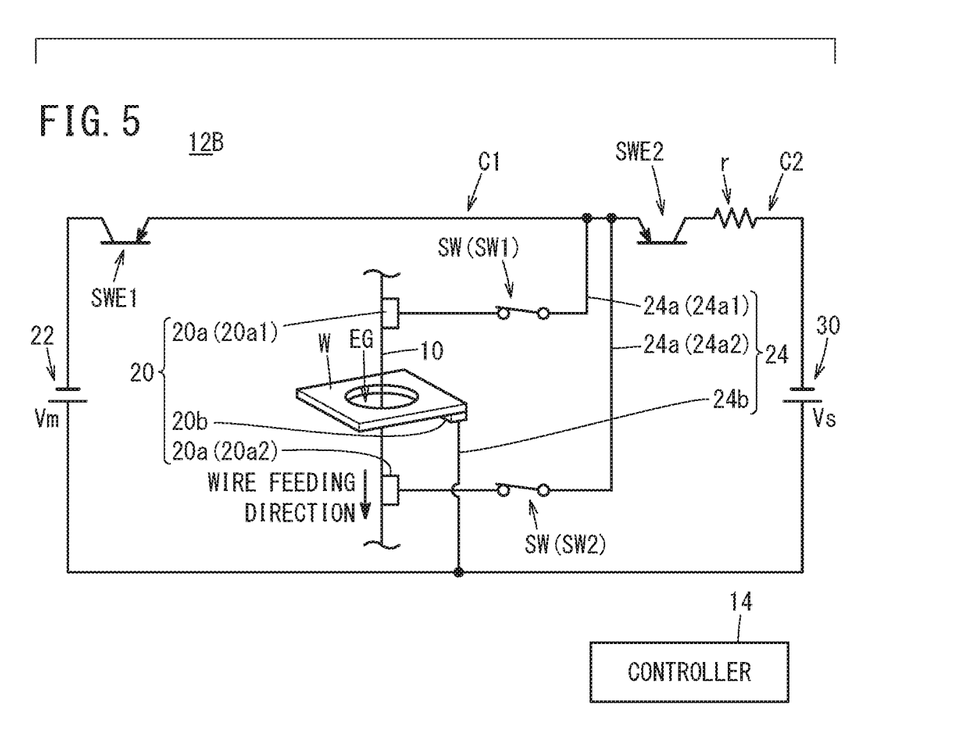
FIG. 5 is a diagram showing a configuration example of a wire electrical discharge machine according to Modification 1.

FIG. 5 is a diagram showing a configuration example of a wire electrical discharge machine 12B in Modification 1. In the following description, Modification 1 is applied to the machining circuit C1 (FIG. 1) described in the first embodiment, but it can also be applied to the machining circuit C1A (FIG. 3) described in the second embodiment.

In addition to the machining circuit C1 and the controller 14, the wire electrical discharge machine 12B of Modification 1 further includes a circuit (hereinafter, referred to as a discharge inducing circuit) C2 for applying a voltage (an inducing voltage) Vs to the electrode gap EG to induce electric discharge. The discharge inducing circuit C2 includes a power source (hereinafter referred to as a discharge inducing power source) 30 and a switching element SWE2 composed of an FET or the like.

The discharge inducing power source 30 includes a DC power supply. In Modification 1, in order to apply a positive polarity voltage Vs to the electrode gap EG, the negative terminal (− terminal) of the discharge inducing power source 30 is connected to the wire electrode 10, and the positive terminal (+ terminal) is connected to the workpiece W. That is, the negative terminal of the discharge inducing power source 30 is connected to the first current supply lines 24a, and the positive terminal is connected to the second current supply line 24b. Here, it should be noted that the discharge inducing power source 30 may be configured to selectively apply one of the positive polarity voltage Vs and the negative polarity voltage Vs to the electrode gap EG.

The switching element SWE2 is used to apply a voltage (inducing voltage) Vs of the discharge inducing power source 30 to the electrode gap EG in order to cause electric discharge across the electrode gap EG. The switching element SWE2 is connected and arranged in series between the discharge inducing power source 30 and the electrode gap EG. When the switching element SWE2 is turned on, the voltage Vs of the discharge inducing power source 30 is applied across the electrode gap EG. That is, as the switching element SWE2 is turned on and off, application of the voltage Vs to the electrode EG is turned on and off accordingly. In the example shown in FIG. 5, the switching element SWE2 is provided between the negative terminal of the discharge inducing power source 30 and the wire electrode 10 (the first electrode parts 20a). However, the switching element SWE2 may be disposed between the positive terminal of the discharge inducing power source 30 and the workpiece W (the second electrode part 20b).

When electric discharge occurs in the electrode gap EG by application of the voltage Vs as a result of turning on the switching element SWE2, the switching element SWE2 is turned off and the switching element SWE1 is turned on so as to apply the voltage Vm across the electrode gap EG. As a result, a machining current flows through the electrode gap EG. Though the discharge inducing circuit C2 is provided, a circuit for applying the inducing voltage Vs to the electrode gap EG may be provided in the machining circuit C1, not in the discharge starting circuit C2.

The discharge inducing circuit C2 may have a resistance r for reducing the voltage applied to the electrode gap EG. This resistance r is connected in series to the discharge inducing power source 30, the electrode gap EG, and the switching device SWE2 between the discharge inducing power source 30 and the electrode gap EG.

Modification 2

Figure 6:
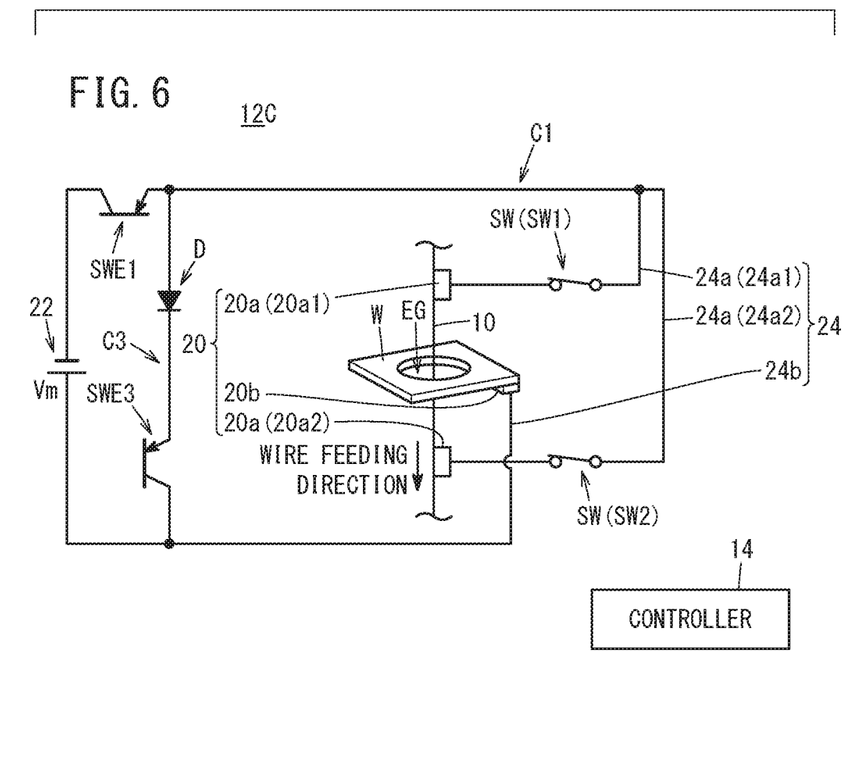
FIG. 6 is a diagram showing a configuration example of a wire electrical discharge machine according to Modification 2.

FIG. 6 is a diagram showing a configuration example of a wire electrical discharge machine 12C in Modification 2. In the following description, Modification 2 is applied to the machining circuit C1 (FIG. 1) described in the first embodiment, but it can also be applied to the machining circuit C1A (FIG. 3) described in the second embodiment.

In addition to the machining circuit C1 and the controller 14, the wire electrical discharge machine 12C of Modification 2 further includes a circuit (hereinafter, referred to as a machining current freewheeling circuit) C3 for returning the machining current that has flowed through the electrode gap EG to the electrode gap EG so as to circulate the current. The machining current freewheeling circuit C3 is provided in the machining circuit C1. The machining current freewheeling circuit C3 includes a diode D and a switching element SWE3.

The machining current freewheeling circuit C3 made up of the diode D and the switching element SWE3 connected in series is arranged in parallel with the electrode gap EG. In Modification 2, the anode of the diode D is connected to the wire electrode 10 (the first electrode parts 20a), and the cathode is connected to the workpiece W (the second electrode part 20b) via the switching element SWE3. The anode of the diode D is connected to a point between the switching element SWE1 and the first electrode parts 20a on the first current supply line 24a.

When, after a machining current has flowed through the electrode gap EG by turning on the switching element SWE1, the switching element SWE1 is turned off and the switching element SWE3 is turned on from the off-state, the electric energy accumulated in the wire electrode 10 and the inductance on the machining current path flows back to the electrode gap EG through the diode D and the switching element SWE3. Therefore, while the switching element SWE3 is ON, the machining current flowing through the electrode gap EG is returned to the electrode gap EG. Accordingly, the amount (magnitude) of the machining current flowing through the electrode gap EG is maintained. Since provision of the freewheeling diode D in this manner makes it possible to supply a low-peak machining current for a long time to the electrode gap, it is possible to further increase the amount (deposit) of molten material of the wire electrode 10 for welding the core to the workpiece W.

Modification 3

In each of the above-described embodiments, the first electrode part 20a connected to the wire electrode 10 is provided each on the upstream side and the downstream side of the workpiece W, but the first electrode part 20a may be provided on only one of them. That is, one of the first electrode parts 20a1 and 20a2 may be omitted. In this case, one of the first current supply lines 24a1 and 24a2 becomes unnecessary correspondingly.

Modification 4

The wire electrical discharge machines 12 and 12A described in the above embodiments may perform electrical discharge machining on the workpiece W which is immersed in a dielectric working fluid stored in an unillustrated work-pan, by flowing a machining current through the electrode gap EG in the working fluid. In this case, the switches SW (SW1, SW2) are arranged at positions not in contact with the working fluid stored in the work-pan. For example, the switches SW (SW1, SW2) are provided outside the work-pan. Adopting this configuration eliminates the necessity of waterproof arrangement for preventing the working fluid from entering the switches SW (SW1, SW2), and the reliability is improved.

Modification 5

In the first embodiment, in order to change the impedance between the first electrode parts 20a (the wire electrode 10)

and the machining power source 22, switches SW are disposed on the first current supply lines 24a (See FIG. 1). However, in Modification 5, a switch SW is disposed on the second current supply line 24b in order to change the impedance between the second electrode part 20b (the workpiece W) and the machining power source 22.

Also in this case, similarly to FIG. 2 the second current supply line 24b may be branched into multiple current lines BL, which are connected to the second electrode part 20b. Further, at least one of the multiple branched current lines BL may have the switch SW thereon. Also in this case, it is possible to change the impedance between the electrode unit 20 and the machining power source 22 by means of the switch SW.

Also in Modification 5, at the time of the cutting process (cutting cycle), the controller 14 turns on (closes) all the switches SW and performs on-off control of the switching element SWE1 to machine the workpiece W. On the other hand, at the time of a core retaining process (retaining cycle), the controller 14 turns off (opens) at least one of the switches SW and performs on/off control of the switching element SWE1. By turning off at least one of the switches SW at the time of the core retaining process, it is possible to increase the impedance between the electrode unit 20 and the machining power source 22, hence sufficiently suppress the machining current flowing through the electrode gap EG without lowering the set value of the machining voltage. Therefore, it is possible to firmly and sufficiently weld cores to the workpiece W. When no machining current flows through the electrode gap EG if all the switches SW are turned off, it never happens that all the switches SW are turned off.

Modification 6

In the second embodiment, in order to change the impedance between the first electrode parts 20a (the wire electrode 10) and the machining power source 22, current suppression elements E are disposed on the first current supply lines 24a while switches SW are provided for the first current supply lines 24a so that each switch SW is connected in parallel with the associated current suppression element E (see FIG. 3). However, in Modification 6, in order to change the impedance between the second electrode part 20b (the workpiece W) and the machining power source 22, a current suppression element E is disposed on the second current supply line 24b while a switch SW is provided in the second current supply line 24b so as to be connected in parallel with the current suppression element E.

Also in this case, similarly to FIG. 4 the second current supply line 24b may be branched into multiple current lines BL, which are connected to the second electrode part 20b. Further, at least one of the multiple branched current lines BL may have the current suppression element E thereon, and a switch SW is provided for the current line BL so as to be connected in parallel with the current suppression element E. Also in this case, it is possible to change the impedance between the electrode unit 20 and the machining power source 22 by means of the switch SW.

Also in Modification 6, at the time of the cutting process (cutting cycle), the controller 14 turns on (closes) all the switches SW and performs on-off control of the switching element SWE1 to machine the workpiece W. On the other hand, in a core retaining process (retaining cycle), the controller 14 turns off (opens) at least one of the switches SW and performs on/off control of the switching element SWE1. By turning off at least one of the switches SW at the time of the core retaining process, it is possible to increase the impedance between the electrode unit 20 and the machining power source 22, hence sufficiently suppress the machining current flowing through the electrode gap EG without lowering the set value of the machining voltage. Therefore, it is possible to firmly and reliably weld cores to the workpiece W. When no machining current flows through the electrode gap EG if all the switches SW are turned off, it never happens that all the switches SW are turned off.

Modification 7

It is possible to adopt any combination of the above Modifications 1 to 5. Further, any combination of the above Modifications 1 to 4 and 6 may also be adopted.

As described above, the wire electrical discharge machine (12, 12A to 12C) described in each of the above-described embodiments and Modifications 1 to 5, uses a machining power source (22) to apply a machining current across an electrode gap (EG) formed between a wire electrode (10) and a workpiece (W) to be machined, and perform electrical discharge machining on the workpiece (W). The wire electrical discharge machine (12, 12A to 12C) includes: an electrode unit (20) for supplying the machining current to the electrode gap (EG); a switch (SW) for changing impedance between the machining power source (22) and the electrode unit (20); and a controller (14) for, at the time of a core retaining process, controlling the switch (SW) to set the impedance to be higher than the impedance in a cutting process, and thereby suppressing the machining current flowing through the electrode gap (EG).

This configuration makes it possible to suppress the machining current flowing through the electrode gap (EG) during a core retaining process to a lower level with a more inexpensive manner than the prior art. Accordingly, it is possible to firmly and sufficiently weld cores to the workpiece (W).

The electrode unit (20) may include a first electrode part (20a) connected to the wire electrode (10) and a second electrode part (20b) connected to the workpiece (W). The switch (SW) may be provided for a first current supply line (24a) connected to the machining power source (22) and the first electrode part (20a) in order to change the impedance between the machining power source (22) and the first electrode part (20a). With this, it is possible to sufficiently suppress the machining current flowing through the electrode gap (EG) during a core retaining process. Therefore, it is possible to firmly and sufficiently weld cores to the workpiece (W).

The switch (SW) may be disposed on the first current supply line (24a). Thus, simply by providing the switch (SW), it is possible to easily change the impedance between the machining power source (22) and the first electrode part (20a).

The first current supply line (24a) may branch into a plurality of current lines (BL) and the multiple branched current lines (BL) may be each connected to the first electrode part (20a). The switch (SW) is disposed on at least one of the multiple branched current lines (BL). This makes it possible to finely change the impedance between the machining power source (22) and the first electrode part (20a).

A current suppression element (E) may be disposed on the first current supply line (24a), and the switch (SW) may be connected in parallel with the current suppression element (E). This arrangement makes it possible to easily change the impedance between the machining power source (22) and the first electrode part (20a) by merely turning on and off the switch (SW).

The current suppression element (E) may be disposed on at least one of the multiple current lines (BL) branched from the first current supply line (24a). With this, it is possible to finely change the impedance between the machining power source (22) and the first electrode part (20a).

The first electrode part (20a) may be provided on each of the upstream side and the downstream side of the workpiece (W) with respect to the feeding direction of the wire electrode (10). The switch (SW) is provided for at least one of the first current supply line (24a1) connected to the machining power source (22) and the first electrode part (20a1) provided on the upstream side, and the first current supply line (24a2) connected to the machining power source (22) and the first electrode part (20a2) provided on the downstream side.

The wire electrical discharge machine (12, 12A to 12C) may perform electrical discharge machining on the workpiece (W) by flowing a machining current through the electrode gap (EG) in a dielectric working fluid stored in a work-pan. In this case, the switch (SW) may be arranged at such a position as not to come into contact with the working fluid stored in the work-pan. With this arrangement, it is possible to prevent fluid such as water from adhering to the switch (SW), and hence prevent such a situation that the switch (SW) is accidentally brought into an ON state due to leak current when the switch (SW) is turned off. Therefore, it is possible to change the impedance between the machining power source (22) and the first electrode part (20a) to a desired value.

The switch (SW) may be provided for a second current supply line (24b) connected to the machining power source (22) and the second electrode part (20b) in order to change the impedance between the machining power source (22) and the second electrode part (20b). With this, it is possible to sufficiently suppress the machining current flowing through the electrode gap (EG) during a core retaining process. Therefore, it is possible to firmly and sufficiently weld cores to the workpiece (W).

The switch (SW) may be disposed on the second current supply line (24b). Thus, simply by providing the switch (SW), it is possible to easily change the impedance between the machining power source (22) and the second electrode part (20b).

The second current supply line (24b) may branch into a plurality of current lines (BL), and the multiple branched current lines (BL) may be each connected to the second electrode part (20b). The switch (SW) may be disposed on at least one of the multiple branched current lines (BL). This makes it possible to finely change the impedance between the machining power source (22) and the second electrode part (20b).

A current suppression element (E) may be disposed on the second current supply line (24b), and the switch (SW) may be connected in parallel with the current suppression element (E). This arrangement makes it possible to simply change the impedance between the machining power source (22) and the second electrode part (20b) by merely turning on and off the switch (SW).

The current suppression element (E) may be disposed on at least one of the multiple current lines (BL) branched from the second current supply line (24b). This makes it possible to finely change the impedance between the machining power source (22) and the second electrode part (20b).

The wire electrical discharge machine (12B) may further include a discharge inducing circuit (C2) for applying, across the electrode gap (EG), an inducing voltage (Vs) for inducing an electrical discharge, before the machining current is supplied.

The wire electrical discharge machine (12C) may further include a machining current freewheeling circuit (C3) for returning the machining current flowing through the electrode gap (EG), to the electrode gap (EG) so as to circulate the machining current. Thereby, it is possible to maintain the amount (magnitude) of the machining current flowing through the electrode gap (EG).

While the invention has been particularly shown and described with reference to preferred embodiments, it will be understood that variations and modifications can be effected thereto by those skilled in the art without departing from the scope of the invention as defined by the appended claims.

What is claimed is:

1. A wire electrical discharge machine using a machining power source to apply a machining current across an electrode gap formed between a wire electrode and a workpiece to be machined and thereby perform electrical discharge machining on the workpiece, comprising:
   an electrode unit configured to supply the machining current to the electrode gap, wherein the electrode unit includes a first electrode part connected to the wire electrode and a second electrode part connected to the workpiece;
   a plurality of switches configured to change impedance between the machining power source and the electrode unit; and
   a controller that controls the plurality of switches during the core retaining process to open at least one of the plurality of switches thereby increasing the impedance between the machining power source and the electrode unit than the impedance between the machining power source and the electrode unit during a cutting process and thereby suppress the machining current flowing through the electrode gap so that during the core retaining process, a core formed during the cutting process is adhered to the workpiece through welding.

2. The wire electrical discharge machine according to claim 1, wherein:
   the at least one of the plurality of switches is provided for a first current supply line connected to the machining power source and the first electrode part in order to change the impedance between the machining power source and the first electrode part.

3. The wire electrical discharge machine according to claim 2, wherein the at least one of the plurality of switches is disposed on the first current supply line.

4. The wire electrical discharge machine according to claim 3, wherein:
   the first current supply line branches into a plurality of current lines;
   the plurality of branched current lines are each connected to the first electrode part; and
   the at least one of the plurality of switches is disposed on at least one of the plurality of branched current lines.

5. The wire electrical discharge machine according to claim 2, further comprising a current suppression element disposed on the first current supply line, wherein the at least one of the plurality of switches is connected in parallel with the current suppression element.

6. The wire electrical discharge machine according to claim 5, wherein:

the first current supply line branches into a plurality of current lines;

the plurality of branched current lines are each connected to the first electrode part; and the current suppression element is disposed on at least one of the plurality of branched current lines.

7. The wire electrical discharge machine according to claim 2, wherein:

the first electrode part is provided on each of an upstream side and a downstream side of the workpiece with respect to a feeding direction of the wire electrode; and the at least one of the plurality of switches is provided for at least one of the first current supply line connected to the machining power source and the first electrode part provided on the upstream side, and the first current supply line connected to the machining power source and the first electrode part provided on the downstream side.

8. The wire electrical discharge machine according to claim 1, wherein the wire electrical discharge machine performs electrical discharge machining on the workpiece by flowing a machining current through the electrode gap in a dielectric working fluid stored in a work-pan; and the at least one of the plurality of switches is arranged at a position not in contact with the dielectric working fluid stored in the work-pan.

9. The wire electrical discharge machine according to claim 1, wherein:

the electrode unit includes a first electrode part connected to the wire electrode and a second electrode part connected to the workpiece; and an additional one of the plurality of switches is provided for a second current supply line connected to the machining power source and the second electrode part in order to change the impedance between the machining power source and the second electrode part.

10. The wire electrical discharge machine according to claim 9, wherein an additional one of the plurality of switches is disposed on the second current supply line.

11. The wire electrical discharge machine according to claim 10, wherein:

the second current supply line branches into a plurality of current lines;

the plurality of branched current lines are each connected to the second electrode part; and an additional one of the plurality of switches is disposed on at least one of the plurality of branched current lines.

12. The wire electrical discharge machine according to claim 9, further comprising a current suppression element disposed on the second current supply line, wherein an additional one of the plurality of switches is connected in parallel with the current suppression element.

13. The wire electrical discharge machine according to claim 12, wherein:

the second current supply line branches into a plurality of current lines;

the plurality of branched current lines are each connected to the second electrode part; and the current suppression element is disposed on at least one of the plurality of branched current lines.

14. The wire electrical discharge machine according to claim 1, further comprising a discharge inducing circuit configured to apply an inducing voltage for inducing an electric discharge, across the electrode gap before the machining current is supplied.

15. The wire electrical discharge machine according to claim 1, further comprising a machining current freewheeling circuit configured to return the machining current flowing through the electrode gap, to the electrode gap so as to circulate the machining current.

* * * * *